Oct. 7, 1958  D. R. GIBBS  2,855,233
MECHANICAL COUPLING
Filed Feb. 7, 1955
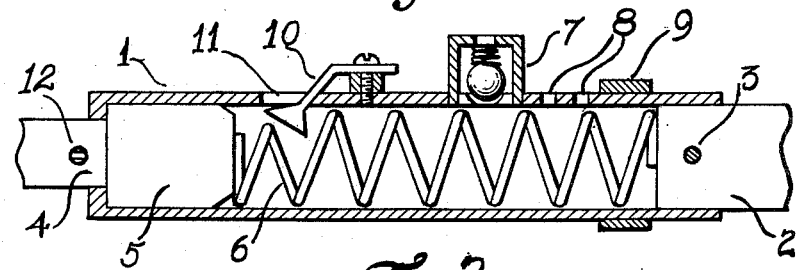
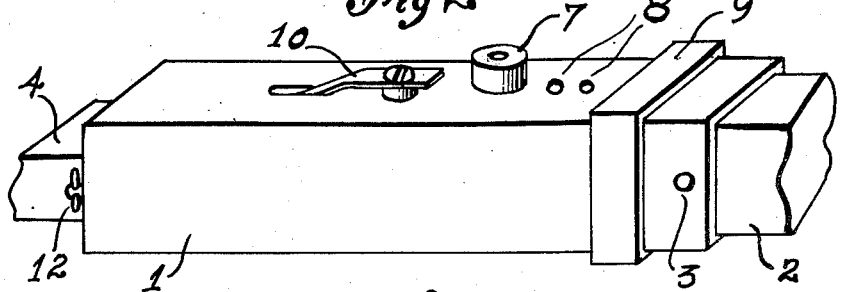
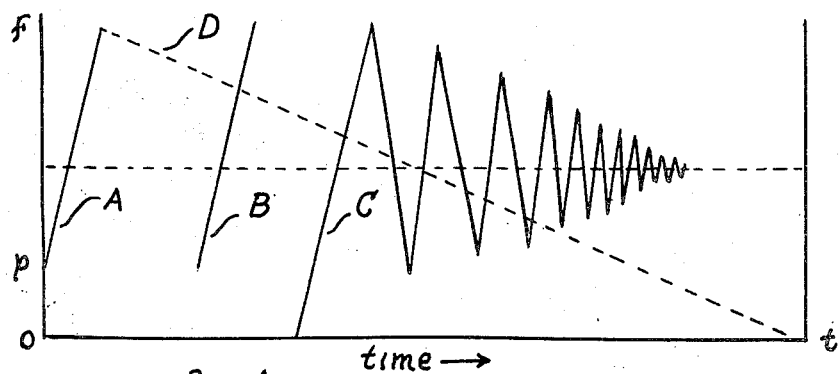
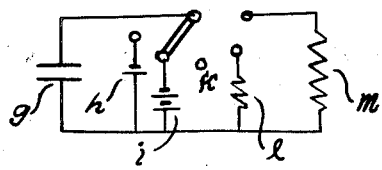
INVENTOR.
DEAN R. GIBBS
BY
his Attorney

United States Patent Office 2,855,233
Patented Oct. 7, 1958

2,855,233

MECHANICAL COUPLING

Dean R. Gibbs, Palmyra, Mo.

Application February 7, 1955, Serial No. 486,580

2 Claims. (Cl. 287—119)

My invention relates to a mechanical coupling and more especially to the type of mechanical coupling as may be employed to transmit rotary motion.

An object of my invention is to provide a means and method for coupling the rotary motion from a driving means to a driven means wherein a certain compliance is incorporated in the device to permit longitudinal motion of the driving member.

More especially the invention I have devised is a form and application of compliant coupling principles embodied in a device which may find wide use in the steering column of a motor vehicle.

Other objects and purposes of my invention will appear from the specification to follow and from an examination of the drawings, wherein: Fig. 1 is a side view in section of a device embodying my invention; Fig. 2 is a combination side, top and end view in perspective and part section of the device embodying my invention; Fig. 3 is a graph illustrating certain engineering features of my invention under conditions of operation and features of other devices heretofore used; and Fig. 4 is a schematic diagram designed to illustrate the operation of my invention by analogy in the field of electrical circuits.

It is well known that two members may be coupled by means of two tubes, one telescoping over the other and further to lock such tubes together so that rotary motion may be transmitted yet by means of guides the tubes will be free to move one within the other for a limited distance. It is also old in the art to have a spring or dash-pot arrangement to return the members to their original condition and position after they have been moved in their horizontal or longitudinal planes. My invention concerns certain improvements in such devices and in the method of controlling such movements in a compliant manner.

By way of definition the word compliant will be used throughout this application and, according to use in the engineering field, it has to do with two parts which coact one upon the other in a specified and determined manner. In a radio loudspeaker what is ordinarily known as a voice coil is frequently coupled to a large paper cone by what is known as a compliant coupling, it being a spring in the form of a spiral so designed and proportioned that for low frequencies the entire assembly of voice coil and cone move together and for certain much higher frequencies the coupling becomes to a great extent ineffective allowing the coil to move alone.

Fig. 1 shows in section a rectangular fixed position member 1, attached to a shaft 2 which might be, for purposes of illustration and understanding of an application, the steering-rod of an automobile. Within the open end of member 1 before the assembly of the device is provided a piston 5 which has an extension 4 leading therefrom. Also within the device I provide a spring 6 bearing against the inside of piston 5 and the end of member 2. Member 2 is secured to member 1 by means of a pin 3 after the parts to be enclosed are in position. Shown on the top side of member 1 is a valve 7, this being shown as merely a spring-loaded ball within a short section of pipe, the ball designed to close the opening in member 1 on which it rests when the device is not in operation. Under conditions of operation as will later be defined the ball will rise allowing air to escape from the top of the short pipe. The details of this valve are not shown since such are not important, any type of pressure relief valve being satisfactory. A plurality of openings are also provided in the wall of member 1, these being shown by the reference numerals 8 and which may be selectively covered as desired by a sliding cover 9.

Also in Fig. 2 as in Fig. 1 will be seen that a catch is employed, which catch consists of a spring 10 to which is secured member 11. Member 11 is so shaped that it will permit piston 5 to move past it in one direction yet so that it will act as a stop and prevent its return to its period of rest or where it initially started. Attention is called to the fact that when piston 5 is held by catch 11, the position of piston 5 within member 1 is not at the greatest distance it is permitted to travel. To release catch 11 it is necessary to use some tool to lift spring 10, the reason for such arrangement appearing later in this specification. Also, for certain applications of my invention it may be necessary or desirable to dispense with the spring 10 and catch 11 altogether, as will be later described.

It will be observed that extension 4 has a pin 12 shown in section in Fig. 1 and taking the form of a cotter-pin with spread ends in Fig. 2. This is an important feature of my invention and provides a completely tight coupling between the driving and the driven members under normal conditions. It is understood that shear pins have been used when rotary motion is to be interrupted under conditions of unusual load requirements, but in my invention the rotary coupling of the driving and the driven members is never broken under any conditions. The breaking or shearing strength of the pin 12 is so chosen that a considerable end thrust is necessary on extension 4 before the pin 12 will shear. To reset the device it is necessary to lift the catch 11 and to insert a new shear pin.

The device is adapted to many uses, one of which is in connection with the steering mechanism of an automobile. In such use the extension 4, being the driving end, would connect to the steering wheel of the car and member 2, the driven end could connect with the worm drive. In operation as such a coupling on a steering column of a car the device would, under normal conditions be a rigid unit with no play in either rotary or longitudinal directions. In event the car being driven is suddenly stopped by impact, the force of the driver being thrown against the steering wheel would be sufficient to shear the pin 12. As pin 12 is sheared the piston 5 would travel longitudinally within the tube first passing catch 11, compressing the spring 6 and traveling in the same direction against the pocket of air confined within member 1. The air is confined within certain limitations as determined by the size of valve 7 and the openings 8 which may or may not be exposed by cover 9. For all practical purposes the amount of air permitted to escape through valve 7 is infinitely more than that permitted to escape through openings 8, the latter being used to permit air to re-enter member 1 and the spring loaded ball in valve 7 being designed to substantially close the opening served by it except when air is being discharged.

An understanding of the operation of my device can be better understood by reference to Fig. 3 which is a graphical representation. The line f—o represents the amount of force which is applied against the piston, the position p representing the shearing point of the pin. Time is represented on the line o—t. The solid line A represents the inward movement of the piston and the dotted line D represents the return movement of the piston. The centrally located dotted line extending from left to right indicates a position where the piston is halted by the catch, or a position of zero on the damped wave curve C. Damped wave C is the typical operation of a device which would have only a spring, the decrement being determined by the design of the spring. Line B is intended to represent the operation of a device which has neither spring or catch but only some type of air trap such as a dash-pot.

Fig. 4 is a simple schematic circuit diagram intended to illustrate the operation of my invention in terms of analogy of the function of a charge and discharge circuit and switching arrangement, similar to the mechanical coupling so far as the principles of operation are concerned. It will be noted that a single pole, four position switch is shown. The circuit elements are a condenser $g$, a one cell battery $h$, a two cell battery $i$, a small resistor $l$, and a larger resistor $m$. Intermediate between the contacts to the two-cell battery $i$ and the small resistor $l$, a contact point without any connection from the same as shown, and by analogy compares to the action of the shearing pin 12 of Fig. 1 and Fig. 2. In operation the switch lever would be thrown to the position to make contact with battery $h$ charging the condenser $g$ by a small amount. In analogy this would be equivalent to a force applied to the driving member 4 in Fig. 1 sufficient to break the shear pin 12 and partly compress the spring 6. In addition the switch lever might be moved to make contact with the larger battery $i$, which would of course place a larger charge on condenser $g$ and by analogy this would compare with more completely charging the spring, that is, in compressing it perhaps to its near limit. Moving switch lever to contact $k$ would leave the charge on the condenser $g$ just as the catch 11 of Fig. 1 holds the compression of the spring 6. Assuming that the condenser $g$ is fully charged, the switch lever could then be moved to make contact with small resistor $l$ which, by way of analogy would be to open apertures 8 and permit a gradual return of the piston 5, or by throwing the switch to make contact with large resistor $m$ and even more slow discharge of the condenser $g$, equivalent to moving the cover 9 shown in Fig. 1 to cover more of the apertures 8.

Of the many applications for use of my improved mechanical coupler, one which would be of great value would be in connection with the steering mechanism of an automobile. Previous attempts have been made to provide what is merely a shock absorber arrangement, the same inserted intermediate the steering wheel and the worm drive pinion. In such arrangements when the driver is suddenly thrown against the wheel the wheel would yield by moving downward according to the force of impact against the wheel and until the force had been expended. Immediately thereafter the spring which was compressed would expend its energy and cause a rebound, which, according to simple mechanical laws would be equivalent to the energy which had caused the compression of the spring. Without some type of damping this might well continue as a sort of repeat performance causing even more injury to the driver than would have occurred had the device not been employed. In the improved coupler of my invention it will be noted that the valve 7 permits a rapid compression of the spring 6, while the valve 7 would close and the release of the energy stored in spring 6 would be gradual, its period being determined by the amount of, air permitted to enter by means of apertures 8 as determined by the position of cover 9. As previously explained, the catch 11 is adapted to prevent the spring from being completely released thereby limiting the rebound possible regardless of the position of cover 9 and the number of apertures 8 exposed.

Another application of my improved coupler is a handhold or support for a landing net used by firemen. The ideal situation would be for the trapped person to jump into a device or medium which would gradually absorb the energy of the falling body, and more important, without rebound.

Another use for the improved coupler of my invention would be in connection with the landing wheels of an airplane. Here it is desired to have some type of shock absorbers which will progressively take up the energy of the plane landing since the cushioning effect is then most necessary. In this use of my invention it will be understood that the catch may or may not be used to restrict the rebound, and if used on landing may be disengaged for purposes of take-off. Whether the catch is to be used for either the landing or the take-off or for both, or not used for either, or whether the apertures 8 should be opened or covered, such controls could be either manually or automatically controlled or placed in operative position, or controlled by hydraulic or electrical means from the control panel of the plane. It is also quite obvious that such control could be by the same means as are employed to raise or lower the landing wheels of the plane.

Finally, it is understood that it is possible to make use of my improved coupler in many ways not described in this specification, without departing from the spirit of my invention. Innumerable illustrations in the drawings together with an unduly long specification would be necessary to show the many uses of my invention. It is to be clearly understood that the scope of my invention is to be determined only from the following claims.

What I claim as my invention is:

1. A coupling system comprising in combination an elongated tubular member having a cross-section other than round, a fixed connection from one end of said member, a piston having a cross-section other than round located within said tubular member at a normal initial position, said piston having an extension protruding from the other end of said member, a spring having its ends contacting the inner surface of said fixed extension and its other end contacting the inner surface of said piston said spring normally forcing said piston in its initial position away from said fixed connection, means to lock said piston at its normal initial position, said means adapted to become inoperative upon the application of an appreciable end thrust to said extension relative to said connection, a valve secured to said member and adapted to open when the air is compressed within said member and to close when the air is not compressed, and a catch secured to said member adapted to prevent the complete return of said piston to its normal initial position.

2. A coupling system comprising in combination an elongated tubular member having a cross-section other than round, a fixed connection from one end of said member, a piston having a cross-section other than round located within said member and having an extension protruding from the other end of said member, means for locking said piston and its extension from longitudinal movement with respect to said fixed connection except upon having an appreciable end thrust force applied against the said extension relative to said fixed connection, a spring extending between the said piston and the said fixed connection, and a valve secured to said member adapted to open upon compression of air within said member and to substantially close when the air is not compressed.

References Cited in the file of this patent

UNITED STATES PATENTS

| | | |
|---|---|---|
| 1,046,338 | Schou | Dec. 3, 1912 |
| 1,982,915 | Jenks | Dec. 4, 1934 |
| 2,553,237 | Camarero | May 15, 1951 |
| 2,644,529 | Baker | July 7, 1953 |